Sept. 15, 1959 G. A. SARLES 2,904,645
HELMET RADIOS INCLUDING A TRANSISTOR AMPLIFIER
Filed Sept. 17, 1956 3 Sheets-Sheet 1

INVENTOR
George A. Sarles
BY McCoy, Greene + Te Grotenhuis
ATTORNEYS

HELMET RADIOS INCLUDING A TRANSISTOR AMPLIFIER

Filed Sept. 17, 1956

3 Sheets-Sheet 2

INVENTOR
George A. Sarles
BY McCoy, Greene & Le Grotenhuis
ATTORNEYS

Sept. 15, 1959 G. A. SARLES 2,904,645

HELMET RADIOS INCLUDING A TRANSISTOR AMPLIFIER

Filed Sept. 17, 1956 3 Sheets-Sheet 3

INVENTOR

George A. Sarles

BY McCoy, Greene + TeGrotenhuis

ATTORNEYS

United States Patent Office 2,904,645

Patented Sept. 15, 1959

2,904,645

HELMET RADIOS INCLUDING A TRANSISTOR AMPLIFIER

George A. Sarles, Rocky River, Ohio

Application September 17, 1956, Serial No. 610,175

2 Claims. (Cl. 179—171)

The present invention relates to electronic sending and/or receiving sets for football helmets, construction helmets, and the like, and more particularly to transistor devices, antennas and associated electrical equipment which fit readily within a helmet.

According to the present invention, a small electronic radio sending or receiving set is mounted within a helmet and an antenna is mounted at the top of the helmet. Where the radio is a receiving set the antenna preferably comprises a series of parallel bars having a length of ¼ wave length and held in parallel relation by a longer perpendicular bar or section having a length of ½ wave length. The antenna may be made in two sections with two of said long bars arranged in parallel relation and a series of the shorter bars mounted on or integral with each of the longer bars and perpendicular thereto. Such an antenna may be made of a thin metal and bent to the curved shape of the helmet and provides a good signal regardless of what direction the helmet is pointed.

Heretofore radio receiving sets have been unnecessarily large even where transistors or miniature tubes were employed and it has been difficult to provide such receivers at a low cost due to the high cost of labor and the expense of printed circuits which are now being used extensively in radios at the present time. The present invention provides a means whereby an excellent miniature radio sending or receiving set can be made economically without the need for printed circuits.

According to the present invention, a generally flat insulating layer is provided and a thin generally flat central plate of electrically conductive metal is bonded to the insulating layer. A plurality of generally flat segmental marginal plates of electrically conductive metal are also bonded to the insulating layer and are arranged around the circumference of the larger central plate, the marginal plates being spaced radially from the central plate and spaced circumferentially from each other so that each metal plate is insulated from the other metal plates by the insulating layer mentioned above which serves to hold the metal plates in position. An electronic circuit may easily be provided by mounting transistor triodes, sub-miniature pentode tubes, or other multi-electrode current or voltage amplifying devices, resistors, capacitors, and the like on the non-metal side of the insulating layer and soldering the wires to the metal plates, suitable holes being provided to permit passage of the wires from the insulating layer to the metal plates. The soldered connections between the wires and the plates and between the wires or associated electrical devices may serve as the sole means to hold the elements of the electronic circuit in place, or, if desired, the elements may be encased in plastic, rubber or other non-conducting material after they have been soldered in place.

The use of the metal plates bonded to an insulating layer facilitates the economical manufacture of very small multi-stage transistor amplifiers, particularly resistance-coupled amplifiers. In such an amplifier, made according to the present invention, the positive terminal of the battery is connected to the larger central metal plate and the negative terminal of the battery is connected to one of the segmental marginal plates. A small resistor is connected to each of the emitter, collector and base electrodes of the transistors, the resistors for each emitter electrode having a wire which extends through an opening near the center of the central plate and is soldered to the central plate, and each of the resistors connected to the collector and base electrodes having wires soldered to one of the marginal plates.

Heretofore it has been customary to employ electrolytic condensers between stages of a transistor amplifier. However, these condensers have prevented reduction in the size of transistor amplifiers. Prior to the present invention it was not known that the extremely small disc-ceramic condensers, which often have a diameter no greater than about ⅛" and a thickness less than 1/16" could be used between stages of the amplifier. I have discovered, quite by accident, that excellent results can be obtained using these very small disc-ceramic capacitors between the amplifier stages. This permits making a transistor amplifier with four or more stages which has a thickness not substantially greater than one-eighth of an inch.

The present invention has many fields of application other than in football helmets. The small radio receiving set is suitable for baseball caps and other rather small caps in addition to many different types of helmets substantially smaller than a football helmet. The use of a radio receiving set within a cap or helmet could greatly reduce the hazards in the construction industry, mining, hunting and in police and fire department work. The device is suitable for use in automobile racing and could be used in office and industrial call systems and in ship-to-shore communication systems.

An object of the present invention is to provide a simple, inexpensive, small-size antenna which is substantially non-directional and which occupies a minimum amount of space within a hat or helmet.

A further object of the invention is to provide a very small transistor amplifier which will fit readily within a hat or helmet and which provides maximum amplification for its size.

Another object of the invention is to provide a very small radio receiving set for a cap or helmet, which provides signals which are clearly audible even in noisy locations.

Still another object of the invention is to provide a means to eliminate printed circuits, to reduce the cost of manufacture of electronic devices, and to reduce unwanted feedback and resulting oscillation and distortion in a radio circuit due to parallel lines and crossover lines and parts, as is usually the case with wired or printed circuits.

Other objects, uses and advantages of the invention will become apparent to those skilled in the art from the following description and claims, and from the drawings in which:

Figures 1, 2, 3, 4, 5:
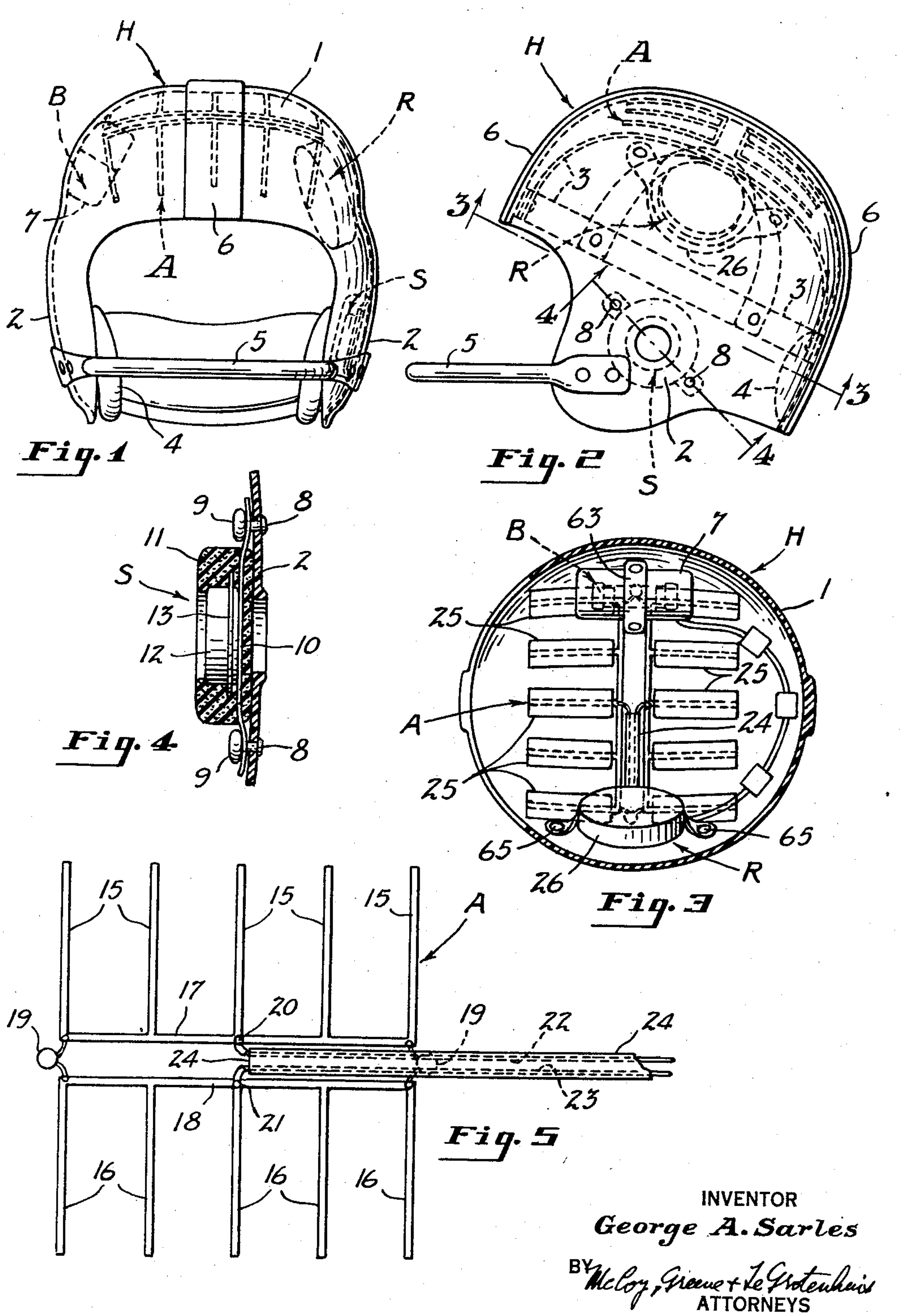
Figure 1 is a front view on a reduced scale of a football helmet incorporating transistor radio-receiving means made according to the present invention.
Figure 2 is a side view of the helmet of Fig. 1 on the same scale.
Figure 3 is a sectional view with parts omitted taken substantially on the line 3—3 of Fig. 2 and on the same scale, looking in the direction of the arrows, the straps of the harness being omitted.
Figure 4 is a fragmentary sectional view taken substantially on the line 4—4 of Fig. 2 and on a larger scale.
Figure 5 is a plan view of an antenna constructed according to the present invention, the antenna being shown in a flat position prior to mounting in the helmet.
Figures 10, 11, 12, 13, 14:
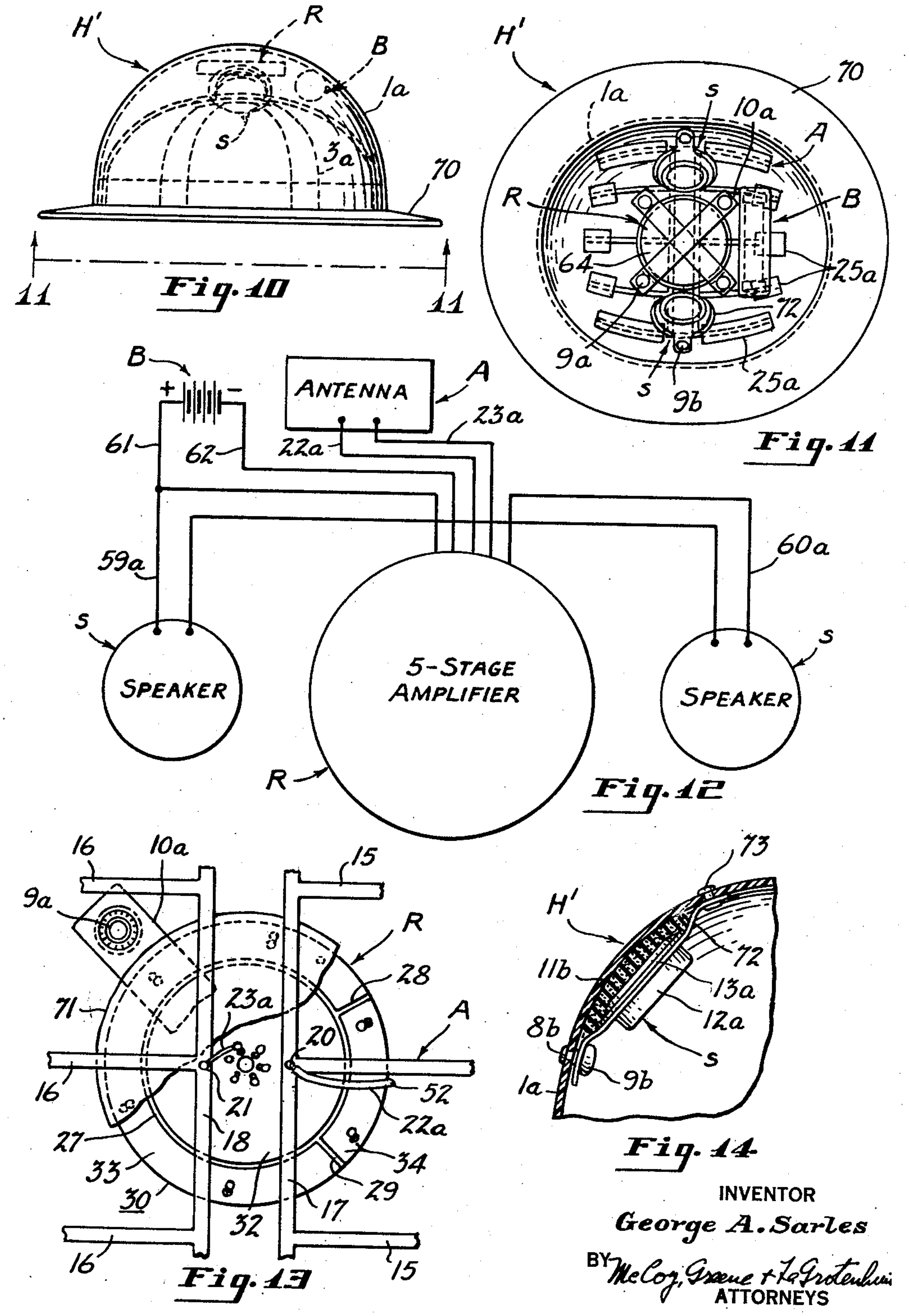
Figure 10 is a front elevational view on a reduced scale of a construction helmet containing a transistor radio-receiving set made according to the present invention.
Figure 11 is a bottom view of the helmet with parts omitted taken on the line 11—11 of Fig. 10, and on the same scale.
Figure 12 is a schematic view of the radio receiving set employed in the helmet of Figs. 10 and 11 which is substantially like the set of Figs. 6 and 9.

Figure 13 is a fragmentary top view with parts broken away and parts omitted, showing the 5-stage transistor amplifier and a portion of the antenna employed in the construction helmet, such amplifier and such antenna being the same as those employed in the football helmet of Figs. 1 and 2; and Figure 14 is a fragmentary vertical sectional view of the construction helmet of Figs. 10 and 11 on a larger scale showing how each of the speakers is mounted on the helmet.

Referring more particularly to the drawings, in which like parts are identified by the same letters and/or numerals throughout the several views, Figs. 1 and 2 show a conventional football helmet H of non-conducting material having a generally ellipsoidal crown or dome portion 1 with ear covering portions 2 integral therewith and extending downwardly at opposite sides of the helmet. The helmet has conventional supporting straps 3 providing a harness for engaging the person's head and has conventional padding 4 to protect the head. A U-shaped plastic mouthguard 5 is rigidly connected to the ear portions 2. As herein shown, the central portion of the helmet is reinforced by a central strip 6 of substantially uniform thickness which extends all the way from the front to the back edge of the helmet and has its center located at the medial vertical plane of the helmet.

A small radio receiving set comprising an array of antenna A, a receiver or amplifier R, at least one loud speaker or ear phone S, and a small battery B is mounted within the football helmet H. The speaker S is mounted on one of the ear covering portions 2 adjacent the ear of the person wearing the helmet. As herein shown, the speaker is connected to the helmet by means of riveted fasteners 8 and cooperating snap fasteners 9 which are located at opposite ends of a flexible strap 10. This strap extends through a slot or passage in an annular sponge rubber member 11 as best shown in Fig. 4 and holds the sponge rubber tightly against the inside of the helmet. The sponge rubber member 11 is substantially annular and has a generally circular central opening of a size to receive the externally cylindrical metal case 12 of the crystal speaker S which has a radially extending metal flange or rim 13. The sponge rubber is provided with a slit or narrow circumferential slot of a size to receive the flange 13 so as to hold the speaker in place.

A high frequency antenna array A is mounted in the top of the helmet, said antenna comprising five metal strips 15 and five metal strips 16 that are parallel and regularly spaced as shown in Fig. 5, which is drawn substantially to scale, and two longer metal strips 17 and 18 which are integral with the strips 15 and 16. The ten strips 15 and 16 are quarter wave antenna and the two strips 17 and 18 are twice as long as the shorter strips, the shorter strips serving as the antenna to receive the signal when the antenna array is pointed in one direction and the longer strips serving as the antenna to receive the signal when the antenna array is turned generally perpendicular to the first mentioned direction. The longer strips 17 and 18 are parallel and are joined to the ends of the shorter strips so as to hold the shorter strips in parallel relation, the antenna array A being made in two sections with the strips 15 and 16 aligned as is apparent from Fig. 5.

The two sections are spaced apart and joined electrically by two disc ceramic capacitors 19 which are connected in the antenna circuit between the adjacent ends of the strips 17 and 18 at the opposite ends of the antenna, the antenna lines being tuned to near resonance by means of said capacitors. Connections to the antenna from the amplifier are made at points 20 and 21 which are located at the center of the strips 17 and 18. As shown in Fig. 5, two wires 22 and 23 of the same length are connected to the antenna at junction points 20 and 21 and are held in parallel relation by a straight piece of insulating plastic 24 of uniform width and thickness which extends almost the full length of the wires. The ends of the wires 22 and 23 are connected to the amplifier R to be hereinafter described.

Figure 5 shows the antenna array A in a flat position prior to mounting in the helmet. The strips 15 to 18 are formed from a thin electrically conductive metal which is flexible and may easily be bent to the shape of the helmet. The metal is preferably silver or other highly electrically conductive metal suitable for high frequency receiving or transmitting antenna. The metal may be very thin, for example only 0.002 inch thick, and may readily be deformed to the desired shape. When the antenna array is mounted in the helmet, it is pressed against the dome portion 1 so as to conform to the shape of said dome portion and is held in place by strips of tape 25 of suitable non-conducting material which are adhered to the dome portion. If desired the tape may be used for insulation purposes and may cover the entire antenna array whose thickness is usually no greater than that of the tape.

The antenna array A shown herein has antenna strips 17 and 18 with a length of 6¼ inches and a width of ⅛ inch and has perpendicular antenna strips 15 and 16 with a length of 3⅛ inches and a width of ⅛ inch, measuring between the cut edges of the array. The strips 15 and 16 are equally spaced and the distance between the inside side edges of the strips 17 and 18 is ⅝ inch. The distance between the junction points 20 and 21 and between the parallel wires 22 and 23 is selected so as to match the antenna to the amplifier. In the arrangement shown herein the wires 22 and 23 are standard 300 ohm wires which have a length which depends upon the distance between the center of the antenna and the amplifier. The distance between the wires 22 and 23 determines the capacitance and therefore is very important when matching the antenna to the amplifier. The capacitance needed may be computed and the coupling 24 containing the wires 22 and 23 may be matched to the input impedance of the receiver so that an excellent signal is sent to the amplifier.

Where the multi-stage amplifier R is mounted at the center of the antenna as in the modified form of the invention shown in Figs. 10 to 14 the long parallel wires 22 and 23 are omitted, and the important dimension when matching the antenna to the amplifier is the distance between the strips 17 and 18 and the distance between the junction points 20 and 21.

The battery B and the receiver or amplifier R may be detachably mounted on the helmet and covered with sponge rubber in any suitable manner, for example like the speaker S. The battery B may be a small cylindrical dry cell battery which fits in a sheet metal battery case or clip rigidly mounted on the inside of the helmet and covered by a block of sponge rubber 7. In the construction shown herein, the receiver R is sandwiched between discs of sponge rubber in a leather cup 26 having radial ears with detachable snap fasteners 65 which hold the cup against the dome portion 1 of the helmet H at one end of the array A. If desired, suitable electric plugs may be provided for detachably connecting the wires from the antenna A, the battery B, and the speaker S to the receiver R and its diode D so that the entire cup 26 can easily be removed. An individual plug may also be provided to facilitate removal of the receiver R without disturbing the wires which are taped to the helmet. The wires 59, 60, 61 and 62 are conventional insulated wires and are preferably held to the dome portion 1 of the helmet by tape or other suitable means.

Figure 9:
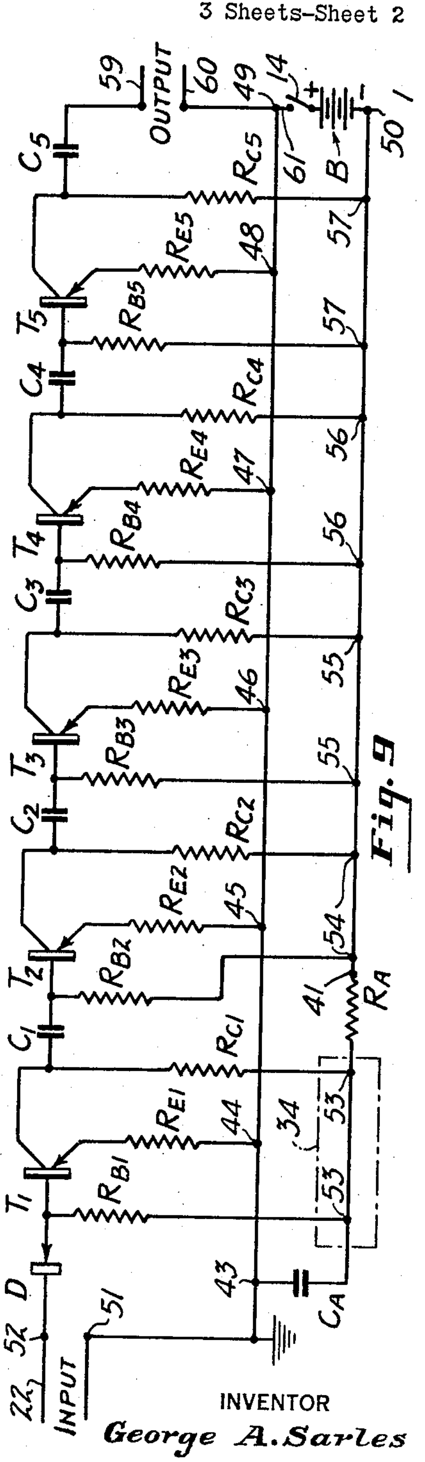
Figure 9 is a diagrammatic view of the electrical circuit of Fig. 6, the insulated copper plate connected to the base and collector resistors of the first stage being shown schematically by dot-dash lines.

Figure 9 shows diagrammatically a circuit diagram for a five-stage, resistance-coupled, grounded emitter, transistor amplifier or receiver R made according to the present invention. The amplifier has a ground connected by a wire 61 to the positive terminal of the battery B (a 22.5 volt dry-cell battery as shown herein) and has a line connected by a wire 62 to the negative terminal of said battery, an optional switch 14 being provided to disconnect the battery when not in use. The wires 22 and 23 from the antenna A are connected to the input of the amplifier R at junction points 52 and 51, respectively, and insulated wires 59 and 60 lead from the output of the amplifier R to the earphone or speaker S which, in the construction shown herein, is a 500,000 ohm germanium crystal speaker. One of the wires from the antenna A is connected to a suitable detector such as a diode or the like or other asymmetrically conducting device which has greater resistance to flow in one direction than in the other. In the construction shown herein the wire 22 is connected at 52 to the germanium crystal diode detector D which is incased in glass as shown in Fig. 6.

Each of the five stages of the amplifier R consists essentially of a transistor triode, three resistors, and one disc-ceramic capacitor. In the device shown herein the transistors, the resistors, and the capacitors for the five stages are the same, but it will be apparent that each stage need not be the same as the next stage. The amplifier has five transistors $T_1$ to $T_5$, each of which comprises a semi-conducting body, an emitter electrode, a collector electrode, and a base electrode in contact with said body, the transistors preferably being PNP junction-type triodes. Five resistors $R_{B1}$ to $R_{B5}$ are provided for connection to the base electrodes of the transistors, five resistors $R_{E1}$ to $R_{E5}$ are provided for connection to the emitter electrodes of the transistors, and five resistors $R_{C1}$ to $R_{C5}$ are provided for connection to the collector electrodes of the transistors. Each of these fifteen resistors has a length of around ½ inch and a diameter of around ⅛ inch. However, an amplifier of this type may be constructed with resistors having a length and a diameter about half the length and diameter, respectively, of the resistances shown herein. A resistance $R_A$ is connected between the metal plate 34 connected to the two resistors of the first stage and the larger metal plate 33 connected to the negative battery terminal, and an electrolytic condenser $C_A$ is connected between said first mentioned plate 34 and the positive ground. The condenser $C_A$ has a diameter and a length about twice the diameter and length of the other resistors, but a smaller size electrolytic condenser could also be used. Five very small disc-ceramic capacitors $C_1$ to $C_5$ are provided to complete the amplifier, one capacitor being located at the output side of each stage of the amplifier. The arrangement of the capacitor $C_A$ and the resistor $R_A$ prevents "motor boating." If desired, another capacitor may be connected between the plates 32 and 33 to reduce feedback but this is usually unnecessary.

It will be apparent that the circuit of Fig. 9 could be made using printed circuits. However, printed circuits are somewhat expensive to make and have disadvantages because of cross-over lines and the like. According to the present invention, a laminated plate is provided which facilitates manufacture of small multistage amplifiers or small radio sending sets and permits manufacture of high quality apparatus at low cost. The laminated plate may be square, circular, or any other suitable shape. However, it is generally easier to cut circular grooves in the plate, and it is usually preferable to cut circular plates even though there is less waste of material by cutting square or rectangular plates.

Figures 6, 7, 8:
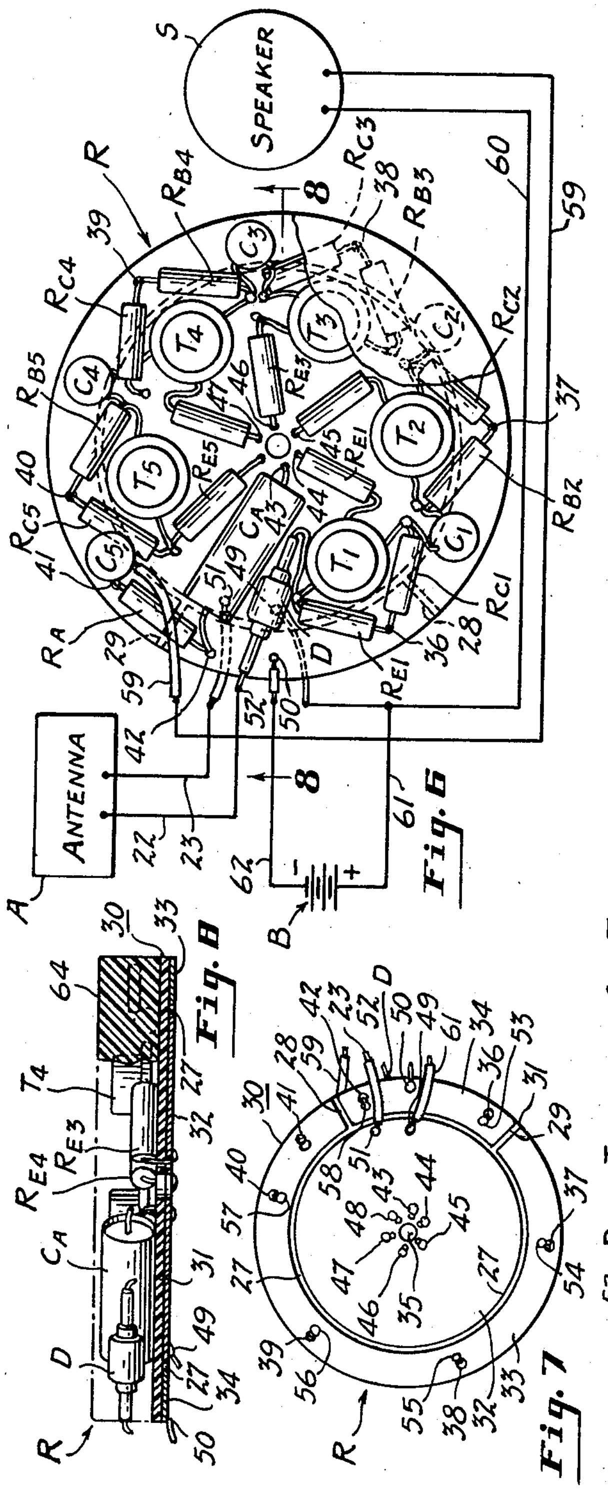
Figure 6 is a top plan view on an enlarged scale of the 5-stage transistor amplifier employed in the helmet of Figs. 1 to 3, with parts broken away, the portions of the circuit connected to the amplifier being shown schematically.
Figure 7 is a bottom view of the amplifier of Fig. 6 on a smaller scale, showing the copper plates and the soldered connection between these plates and the wires of the amplifier.
Figure 8 is a vertical sectional view of the amplifier taken generally along the line indicated at 8—8 in Fig. 6 and on the same scale, with parts broken away, the outline of the plastic encasing the parts of the electronic circuit being shown in dot-dash lines.

Figures 7 and 8 show the construction of a laminated plate made according to the present invention and how the parts of the amplifier may be mounted on the plate. As shown in these figures a flat circular laminated disc or plate 30 is provided having a plastic insulating layer 31 of uniform thickness coextensive with the plate and three flat plates of electrically conductive metal bonded to the flat surface of the insulating layer. The laminated disc 30 is cut from a sheet consisting of a layer of plastic and a layer of copper or other suitable metal bonded to the plastic. The disc 30 is cut to circular shape and a narrow circular groove 27 is cut in the metal portion of the disc down to the plastic insulating layer 31 without cutting through the plastic so as to form a central circular metal plate 32 which is separate from the metal of the margin of the disc 30 radially outwardly of the groove.

A pair of narrow radial grooves 28 and 29 are then cut from the circumferential groove 27 to the concentric outer edge of the laminated disc to separate the marginal metal portion of the disc into a large segmental marginal plate 33 which extends more than half way around the concentric central plate 32 and a small segmental marginal plate 34 as best shown in Fig. 7. The radial grooves 28 and 29 separate the plates 33 and 34 circumferentially and the plastic layer 31 holds these plates out of engagement and insulates the plates from each other. The layer 31 also holds the central plate 32 out of engagement with the marginal plates 33 and 34 and insulates said central plate from the marginal plate. A circular hole 35 is preferably cut through the center of the laminated disc 30 to facilitate cutting of the disc and cutting of the concentric groove 27.

A multiplicity of small holes 36 to 48 are drilled through the laminated disc 30 to facilitate electrical connections between the metal plates 32 to 34 and the elements of the transistor amplifier on the opposite side of the disc 30. The holes 36 and 42 are drilled through the plastic layer 30 and the opposite end portions of the small segmental plate 34. The holes 37 to 41 are spaced circumferentially along the larger marginal plate 33 and the holes 43 to 48 are grouped around the central hole 35, as shown in Fig. 7.

The manner in which the amplifier is mounted on the laminated disc 30 will be apparent from Figs. 6 to 9. All of the parts of the amplifier are mounted on top of the plastic layer 31 away from the electrically conductive metal plates 32 to 34 bonded to the bottom of said layer. Each stage of the amplifier is arranged in generally the same manner. In the first stage, for example, one wire end of the resistor $R_{B1}$ is connected to the base electrode of the transistor $T_1$, and the wire from the diode D and the opposite end of the said resistor extends through the hole 36 and is soldered to the plate 34 at junction 53. The wire end of the resistor $R_{C1}$ is connected to the collector electrode of the transistor $T_1$ and to the wire from the disc-ceramic capacitor $C_1$, the opposite wire end of said resistor also extending through the hole 36 and being soldered to the plate 34 at the junction 53. The wire end of the resistor $R_{E1}$ is joined to the emitter electrode of the transistor $T_1$, and the opposite wire end extends through the hole 44 and is soldered to the bottom of the central plate 32. The other stages of the amplifier are formed in generally the same way except that the ends of the resistors for the base and collector electrodes are soldered to the plate 33 at junctions 54 to 57 instead of to the plate 34.

Each of the condensers $C_1$ to $C_4$ has one wire soldered to the resistor for the collector electrode of one stage and a wire soldered to the resistor for the base electrode of the next higher stage. The condenser $C_5$ is soldered to the wire from the resistor $R_{C5}$ and has another wire soldered to the end of an insulated wire 59 leading to the earphone or speaker S. The ends of the resistors $R_{E1}$ to $R_{E5}$ extend through the holes 44 to 48, respectively, and are soldered to the central plate 32. One wire from the condenser $C_A$ extends through the central hole 43 and is soldered to the plate 32 and the other wire from said condenser extends through the hole 42 and is soldered to the plate 34 at junction 58. One end of the resistor $R_A$ also extends through the hole 42 and is soldered at 58, and the other wire from said resistor extends through the hole 41 and is soldered to the bottom of the plate 33. The resistors for the base and collector electrodes of the transistors $T_2$ to $T_5$ have wire ends which extend through the holes 37 to 40 respectively and are soldered to the plate 33 at junctions 54 to 57, respectively.

The parts may be arranged substantially as shown in Fig. 6 which is an enlarged view drawn substantially to scale. The end of the wire 23 from the antenna A is soldered to the bottom of the central plate 32 at junction 51, and the end of the other antenna wire 22 is soldered to the wire from the diode D at junction 52. The end of the insulated wire 61 from the positive terminal of the battery is soldered to the bottom of the plate 32 at junction 49 and the end of the insulated wire 62 from the negative terminal of the battery is soldered to the bottom plate 34 at junction 50. The lines 59 and 60 to the speaker S are connected as shown schematically in Fig. 6 so that the speaker is connected to the output of the amplifier. Crystal phones or a crystal loud speaker may be employed at S.

Manufacture of the amplifier is relatively simple. Three resistors are connected to each transistor and are bunched around that transistor generally as shown in Fig. 6. If desired the wire ends of the collector and base resistors may be twisted together. The wire ends from the resistors are then dropped through the holes (36 to 48) at the center and the margins of the disc 30 and are soldered in place. The solder holds the resistors and the transistors tightly in place so that no more support is needed. The parts of the amplifier may, therefore, be held in place solely by the soldered wires. However, if desired, the parts may be encased in plastic, rubber, or other non-conducting material to protect them against damage. Such a material may be poured over the parts after they have been soldered in place or may be applied in various other ways. Polyurethane, for example, could easily be applied. If desired, the amplifier may be placed in a thin-walled plastic bag before the plastic covering layer is applied so that the plastic will not stick to the parts and so that the plastic may be cut away and removed readily to permit removal and replacement of parts. As shown in Fig. 8, the parts of the amplifier are covered by a layer of plastic 64 of uniform height having the same shape as the disc 30, the height of the plastic layer being slightly greater than that of the condenser $C_A$ and the other parts of the amplifier which are smaller than said condenser.

If desired, plugs may be provided for the transistors so that each transistor can be removed without breaking any of the soldered connections. The use of plugs facilitates selective assembly and is desirable for this reason, but it is preferable to omit plugs since they tend to increase the size of the unit. It will be apparent that the units shown herein can be redesigned so as to be only half of the present size (about the size of a fifty cent coin) where the resistors and transistors are replaced by smaller units which are now available commercially. The use of the disc ceramic condensers $C_1$ to $C_5$ greatly facilitates the making of extremely small transistor units. The laminated disc 30 also facilitates the making of extremely small units and materially reduces the cost of making such units.

While it will be understood that the circuit specifications of the amplifier R and associated elements of the radio receiving set may vary according to the design for any particular application, and may be changed substantially by those skilled in the art without departing from the spirit of this invention, these specifications are given by way of example only to illustrate one form of the invention which provides a radio with a frequency range of about 260 to 270 megacycles, a high decibel gain, and excellent reception. In the radio shown in Fig. 6, each of the five condensers $C_1$ to $C_5$ is a disc-ceramic capacitor with a capacitance of 0.01 microfarad, each of the five transistors $T_1$ to $T_5$ is a 2N107 PNP junction-type transistor triode made by General Electric Co., each of the five base-electrode resistors $R_{B1}$ to $R_{B5}$ has a resistance of 1,000,000 ohms (1 megohm), each of the five collector-electrode resistors $R_{C1}$ to $R_{C5}$ has a resistance of 10,000 ohms (.01 megohm), each of the five emitter-electrode resistors $R_{E1}$ to $R_{E5}$ has a resistance of 1,000 ohms (.001 megohm), and resistor $R_A$ has a resistance of 22,000 ohms, the electrolytic condenser $C_A$ has a capacitance of 10 microfarads, the detector D is a Sylvania ultra high frequency 1N82 germanium crystal diode, and the source of current B is a small 22.5 volt dry-cell battery.

As herein shown, the emitter resistors $R_{E1}$ to $R_{E5}$ are connected to the plate 32 which has a surface area substantially greater than the total surface area of the plates 33 and 34 which are located in the same plane as the plate 32. It has been discovered that, due to the electrical relation between the head of the person wearing the helmet and the plate 32, a vastly improved signal is obtained with this arrangement wherein the larger plate 32 is grounded. The reception is decreased materially if the parts forming the circuit of Fig. 9 are rearranged so that the plate 32 is negative, the plate 33 is positive and the resistor connections are reversed so that the emitter resistors $R_{E1}$ to $R_{E5}$ are connected to the plate 33.

Figures 10 to 14 show a modified form of the present invention wherein the radio receiving set is mounted in a conventional construction helmet H′. The receiving set is the same as that of Figs. 1 to 9 and employs the same antenna array A and the same receiver R and battery B, but the single 500,000 ohm crystal speaker S is replaced by two 250,000 ohm series-connected crystal speakers *s*, the circuit being shown schematically in Fig. 12. The construction helmet H′ has a generally ellipsoidal dome portion 1*a* and a horizontally projecting rim portion 70 for shading the head. The helmet is of conventional construction and includes head-engaging straps 3*a* which cross to form a harness for supporting the helmet on the head. The same antenna array A shown in Fig. 5 is employed but the wires 22 and 23 are replaced by short wires 22*a* and 23*a*. The plastic-covered receiver or amplifier R used in the construction helmet H′ is also the same as the receiver R of Figs. 6 and 7, but the receiver is mounted in a slightly different manner and is located at the center of the antenna array rather than at the end thereof as in the helmet H.

The antenna array A is bent to conform to the shape of said dome portion and is held against the dome portion by tape strips 25*a*. The center of the antenna array is at the top center of the helmet H′, and the receiver R is mounted just below the antenna with its center at the center of said array. The wire 22*a* is soldered to the input side of the detector D at point 52 and to the center of the strip 17 at the junction point 20, said wire being insulated substantially throughout its length so as not to conduct electricity directly to the metal plates of the disc 30. The wire 23*a* is soldered to the central plate 32 of the receiver and to the center of the strip 18 at point 21 as shown in Fig. 13.

It is necessary to insulate the metal plates of the laminated disc 30 from the antenna array A. This may be accomplished in various ways, for example by covering the area with tape. However, as herein shown, a disc of sponge rubber 71 is inserted between the antenna array A at the top of the helmet and the metal side of the insulating disc 30. The receiver R and the disc 30 thereof is held against the sponge rubber disc 71 and is held in position by a pair of crossing straps 10*a* having snap fasteners 9*a* at their opposite ends which connect with fasteners mounted on the helmet as will be apparent from Fig. 11.

The two speakers are mounted at opposite sides of the receiver R above the two ears of the person wearing the helmet. Each speaker *s* has an externally cylindrical metal case 12*a* enclosing the germanium crystal and a radially extending metal flange 13*a*. A strap 72 is provided which is connected at one end to the helmet by a rivet 73 and which has a marginal portion with a circular opening therein of a size to receive the cylinder 12*a*, said marginal portion engaging the rim 13*a* and holding the speaker against the sponge rubber disc 11*b*. A snap fastener 9*b* is provided at the bottom of the strap for engaging the riveted fastener 8*b* connected to the dome portion 1*a* of the helmet.

The battery B is mounted at the back side of the receiver R and is connected to the helmet and insulated from the antenna by any suitable means.

The helmet H′ serves as a sounding box for the signals emitted by the speakers *s* so that the sounds are clearly audible. It will be apparent, however, that the two speakers *s* could be arranged at a lower position so as to engage both ears of the person wearing the helmet or in various other positions.

It will be understood that the above description is by way of illustration rather than limitation and that, in accordance with the provisions of the patent statutes, variations and modifications of the specific devices shown herein may be made without departing from the spirit of the invention.

Having described my invention, I claim:

1. A multi-stage miniaturized resistance-coupled grounded-emitter transistor amplifier comprising a generally flat circular laminated plate having a first insulating layer and electrically conducting portions bonded to said insulating layer, said portions including a circular central portion and marginal portions extending around said central portion and having a surface area which is small compared to that of said central portion, the marginal portions being spaced radially from the central portion by an annular groove and circumferentially from each other by radial grooves whereby the central and marginal portions are held apart and are insulated from each other by said insulating layer; a plurality of holes through said plate at the central and marginal portions; said amplifier including a series of stages, each stage comprising a transistor having a semi-conductor body, an emitter electrode, a collector electrode, and a base electrode in contact with said body, a resistor having one wire end connected to the emitter electrode and the other end extending through a hole near the center of the plate and connected to said central electrically conducting portion, a resistor having one wire end connected to the collector electrode and its opposite wire end extending through a hole in said plate and connected to one of the marginal electrically conducting portions, and a resistor having one wire end connected to the base electrode and its opposite wire end extending through a hole in said plate and connected to one of the marginal electrically conducting portions; and a battery having a positive terminal connected to the central portion and a negative terminal connected to one of said marginal portions.

2. A miniature multi-stage resistance-coupled grounded-emitter transistor amplifier comprising a circular laminated plate having a plastic layer and a metal layer, said metal layer being cut to provide a circular central plate, an annular divided marginal plate surrounding the central plate and insulated therefrom by said plastic, and a narrow circular groove between the central and marginal plates, said marginal plate being divided into two pieces which are insulated from each other and from the central plate by the plastic layer, a battery having a positive terminal connected to said central plate and a negative terminal connected to one of said marginal pieces, a series of transistors, one for each stage of the amplifier, each transistor having a semi-conducting body, an emitter electrode, a collector electrode and a base electrode in contact with said body, the collector electrode and one of the other electrodes of the transistor of each stage being the output electrodes of that stage, means in each stage for applying a voltage in one direction between each emitter electrode and its associated base electrode and for applying a voltage in the reverse direction between each collector electrode and its associated base electrode comprising said battery, a resistor between the emitter electrode of the transistor of that stage and a line from the positive terminal of the battery, a resistor between the collector electrode of the transistor of that stage and a line from the negative terminal of the battery, and a resistor between the base electrode of the transistor of that stage and the last-named line, a signal source coupled to the input circuit of the first stage, a load coupled to the output circuit of the last stage, a disc-ceramic capacitor between each stage and the next succeeding stage, a disc-ceramic capacitor between the last stage and the said load, each of the resistors connected to an emitter electrode having a wire extending through said laminated plate and soldered to said central plate, each of the resistors connected to the collector and base electrodes of a transistor other than the first-stage transistor having a wire extending through said laminated plate and soldered to said one of said pieces, and each of the resistors connected to the collector and base electrodes of the transistor of the first stage having a wire extending through said laminated plate and soldered to the other of said pieces, a resistor connected between said marginal pieces and a condenser connected between said central plate and said other marginal piece.

References Cited in the file of this patent

UNITED STATES PATENTS

| | | |
|---|---|---|
| 2,192,532 | Katzin | Mar. 5, 1940 |
| 2,507,225 | Scheldorf | May 9, 1950 |

FOREIGN PATENTS

| | | |
|---|---|---|
| 397,959 | Great Britain | Sept. 7, 1933 |

OTHER REFERENCES

Popular Mechanics, "Radio Up Your Sleeve," April 1950, pages 133–136, 248.

Bakelite Review, "Small Space—Big Advantages," July 1951, pages 10–12.

Electrical Engineering, "Transistor Broadcast Receivers," December 1954, pages 1107–1112.

Radiations, vol. 1, No. 5, "Printed Circuits," received Patent Office March 28, 1955, 4 pages.